United States Patent
Hong et al.

(10) Patent No.: US 11,755,315 B2
(45) Date of Patent: Sep. 12, 2023

(54) BOOT ROM UPDATE METHOD AND BOOT-UP METHOD OF EMBEDDED SYSTEM

(71) Applicant: SAMSUNG ELECTRONICS CO., LTD., Suwon-si (KR)

(72) Inventors: Hyun Sook Hong, Hwaseong-si (KR); Ji Soo Kim, Seongnam-si (KR); Seung Jae Lee, Hwaseong-si (KR); Seok Gi Hong, Suwon-si (KR)

(73) Assignee: Samsung Electronics Co., Ltd.

( * ) Notice: Subject to any disclaimer, the term of this patent is extended or adjusted under 35 U.S.C. 154(b) by 811 days.

(21) Appl. No.: 16/543,533

(22) Filed: Aug. 17, 2019

(65) Prior Publication Data

US 2020/0183677 A1  Jun. 11, 2020

(30) Foreign Application Priority Data

Dec. 5, 2018 (KR) .......................... 10-2018-0155212

(51) Int. Cl.
  *G06F 8/65* (2018.01)
  *G06F 9/4401* (2018.01)
  (Continued)

(52) U.S. Cl.
  CPC .............. *G06F 8/66* (2013.01); *G06F 9/4401* (2013.01); *G06F 21/575* (2013.01); *H04L 9/30* (2013.01);
  (Continued)

(58) Field of Classification Search
  CPC ........ G06F 8/66; G06F 9/4401; G06F 21/575; G06F 2221/034; G06F 21/572;
  (Continued)

(56) References Cited

U.S. PATENT DOCUMENTS 7,010,680 B2  3/2006  Nakaya
7,711,944 B2  5/2010  Kwon
(Continued)

FOREIGN PATENT DOCUMENTS

KR           0876748 B1   12/2008
KR   10-2012-0092222 A    8/2012
(Continued)

OTHER PUBLICATIONS

EPO Search Report dated Mar. 11, 2020 Cited in Corresponding EPO Application No. 19213325.4.
(Continued)

*Primary Examiner* — Jaweed A Abbaszadeh
*Assistant Examiner* — Brian J Corcoran
(74) *Attorney, Agent, or Firm* — Fish & Richardson P.C.

(57) ABSTRACT

A boot Read-Only Memory (ROM) update method and a boot-up method of an embedded system are provided. The boot Read-Only Memory (ROM) update method of an embedded system including a memory and a ROM. The memory includes a user data area and a boot ROM area that includes a first area and a second area. The ROM copies a first boot code from the boot ROM area during boot-up. The boot ROM update method includes writing a second boot code to the second area in response to a first ROM update command. The second boot code includes a second boot ROM image and a second signature for the second boot ROM image. The method also includes verifying validity of the second signature and, if the second signature is valid, swapping the first area and the second area. The first boot code is disposed in the first area and includes a first boot ROM image and a first signature for the first boot ROM image.

18 Claims, 12 Drawing Sheets

(51) Int. Cl.
*H04L 9/30* (2006.01)
*H04L 9/32* (2006.01)
*G06F 21/57* (2013.01)

(52) U.S. Cl.
CPC .......... *H04L 9/3242* (2013.01); *H04L 9/3247* (2013.01); *G06F 2221/034* (2013.01)

(58) Field of Classification Search
CPC .......... G06F 8/654; G06F 9/4406; G06F 8/65; H04L 9/30; H04L 9/3242; H04L 9/3247
See application file for complete search history.

(56) References Cited

U.S. PATENT DOCUMENTS

| | | | |
|---|---|---|---|
| 8,996,851 | B2 | 3/2015 | Dolgunov et al. |
| 9,117,082 | B2 | 8/2015 | Landers, Jr. et al. |
| 9,348,730 | B2 | 5/2016 | Odlivak et al. |
| 9,471,785 | B2 | 10/2016 | Zaidi et al. |
| 9,880,856 | B2 | 1/2018 | Akdemir et al. |
| 2006/0149918 | A1* | 7/2006 | Rudelic ............... G06F 12/1441 711/202 |
| 2011/0087872 | A1* | 4/2011 | Shah .................... G06F 21/575 713/2 |
| 2015/0098563 | A1* | 4/2015 | Gulley ................. H04L 9/0643 380/28 |
| 2015/0200934 | A1* | 7/2015 | Naguib ................. G06F 21/575 713/168 |
| 2016/0048459 | A1* | 2/2016 | Oh ......................... G06F 21/79 711/103 |
| 2016/0048684 | A1* | 2/2016 | Kocher ................. H04L 9/0631 713/2 |
| 2017/0046229 | A1 | 2/2017 | Hsu et al. |
| 2017/0147356 | A1* | 5/2017 | Kotary .................. G06F 21/575 |
| 2017/0185781 | A1 | 6/2017 | Kim |
| 2018/0217834 | A1 | 8/2018 | Park et al. |

FOREIGN PATENT DOCUMENTS

| | | |
|---|---|---|
| WO | WO0007106 | 2/2000 |
| WO | WO2011019390 A1 | 2/2011 |

OTHER PUBLICATIONS

EP Office Action dated Mar. 11, 2021 Cited in Corresponding EP Application No. 19213325.4.

* cited by examiner

BOOT ROM UPDATE METHOD AND BOOT-UP METHOD OF EMBEDDED SYSTEM

This U.S. non-provisional patent application claims the benefit of priority under 35 U.S.C. § 119 to Korean Patent Application No. 10-2018-0155212, filed on Dec. 5, 2018 in the Korean Intellectual Property Office, the disclosure of which is incorporated herein by reference in its entirety.

BACKGROUND

1. Field

The present disclosure relates to a boot Read-Only Memory (ROM) update method and a boot-up method of an embedded system.

2. Description of the Related Art

As hardware functions of an electronic device, such as a computer, have varied, an Operating System (OS) has been developed in tandem. The OS is provided in a form capable of providing various functions and allowing the electronic device to implement various application programs, but the capacity requirements imposed on the OS have excessively increased due to volume and complexity of the functions. For example, in a computer the OS may be provided in a disk, and the OS fetched from the disk at boot=up. A problem has arisen in that it takes a long period of time to execute the OS by simultaneously performing boot-up and the execution of a kernel.

In order to address this problem, electronic devices, such as smart phones, Personal Digital Assistants (PDAs), and Internet home appliances, have recently and mainly adopted an embedded OS-based system, in which an OS is stored in a separate chip to be embedded in a device, instead of being fetched from a disk as in a computer.

SUMMARY

Embodiments of the present disclosure provide a boot Read-Only Memory (ROM) update method of an embedded system.

Embodiments of the present disclosure also provide a boot-up method of an embedded system.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an embodiment of the present disclosure, an embedded system includes a memory and a Read-Only Memory (ROM). The memory includes a user data area and a boot ROM area that includes a first area and a second area. The ROM copies a first boot code from the boot ROM area during boot-up. A boot ROM update method of the embedded system includes writing a second boot code to the second area in response to a first ROM update command. The second boot code includes a second boot ROM image and a second signature for the second boot ROM image. The boot ROM update method also includes verifying the validity of the second signature and, if the second signature is valid, swapping the first area and the second area. The first boot code is disposed in the first area and includes a first boot ROM image and a first signature for the first boot ROM image.

According to the aforementioned and other embodiments of the present disclosure, a boot Read-Only Memory (ROM) update method of an embedded system includes receiving a ROM update command, writing a new boot code to a backup boot ROM area, verifying the validity of the boot code using a Digital Signature Algorithm (DSA) and if the boot code is valid, changing the backup boot ROM area into a main boot ROM area.

According to another embodiment of the present disclosure, a boot-up method of an embedded system includes executing, by a Read-Only Memory (ROM), a boot ROM loader, and loading, by the boot ROM loader, a first boot code from a memory. The boot-up method also includes executing, by the ROM, a boot loader by verifying the integrity of the boot loader, verifying, by the boot loader, the integrity of a kernel and verifying, by the kernel, the integrity of a file system.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

A boot Read-Only Memory (ROM) update method of an embedded system according to some embodiments of the present disclosure will hereinafter be described with reference to FIGS. 1 through 9.

Figure 1:
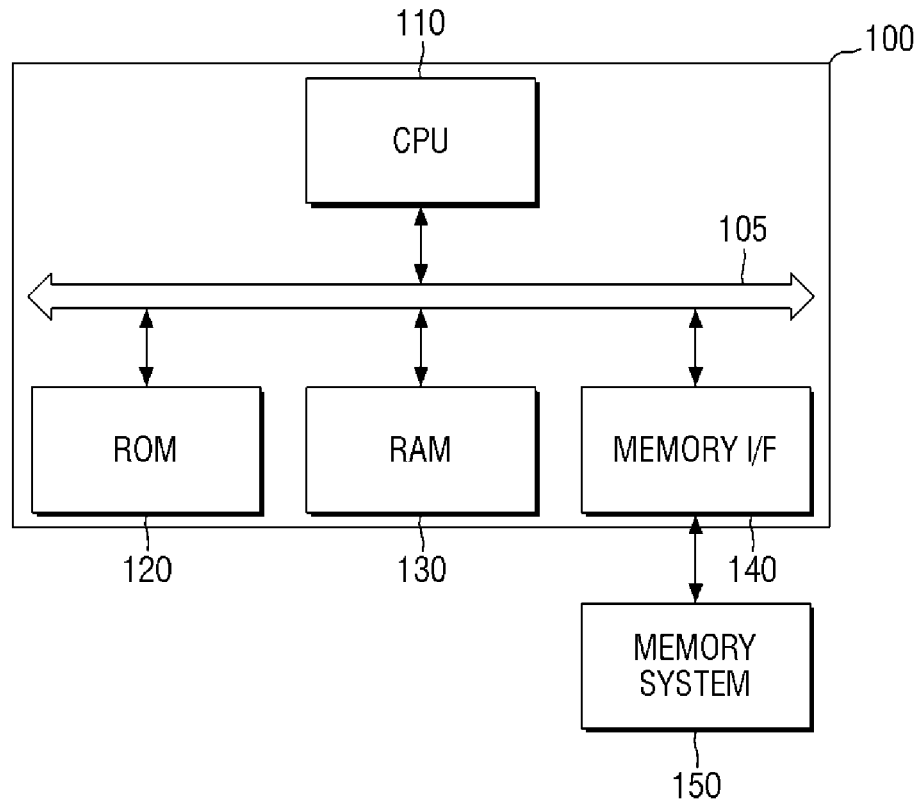
FIG. 1 is a block diagram illustrating an embedded system according to some embodiments of the present disclosure.

FIG. 1 is a block diagram illustrating an embedded system according to some embodiments of the present disclosure.

Referring to FIG. 1, the embedded system according to some embodiments of the present disclosure includes a host device 100 and a memory system 150.

The host device 100 may transmit data and a command to perform a read operation, a write operation, or an erase operation to the memory system 150. Accordingly, the memory system 150 may read, write, or erase data in accordance with a command.

The host device 100 may be implemented as a Personal Computer (PC), a laptop computer, a mobile phone, a smartphone, a tablet PC, a Personal Digital Assistant (PDA), an Enterprise Digital Assistant (EDA), a digital camera, a Portable Multimedia Player (PMP), a Portable Navigation Device (PND), an MP3 player, or an e-book reader.

The host device 100 may include a CPU 110 (Central Processing Unit), a ROM 120, a RAM 130 (random access memory), and a memory interface 140.

The CPU 110 may execute an operating system OS stored or resident in the ROM 120 or the RAM 130. The CPU 110 may execute and control a program stored in the ROM 120 or the memory system 150. The CPU 110 may control the overall operations of the host device 100.

The ROM 120 may store data necessary for booting up the host device 100. The RAM 130 may be used as a main memory or a cache memory of the host device 100 or may temporarily store data to be provided to the memory system 150.

The RAM 130 may be, for example, a Dynamic Random Access Memory (DRAM) such as a Synchronous DRAM (SDRAM), a Double Data Rate SDRAM (DDR SDRAM), a Low Power DDR SDRAM (LPDDR SDRAM), a Graphics DDR SDRAM (GDDR SDRAM), a DDR2 SDRAM, a DDR3 SDRAM, or a DDR4 SDRAM or a Static RAM (SRAM), but the present disclosure is not limited thereto.

The memory system 150 may be a nonvolatile data storage medium to/from which data can be electrically written/erased. The memory system 150 may be a Solid State Drive (SSD), a flash memory card, a MultiMedia Card (MMC), a Universal Serial Bus (USB) flash driver, a SmartMedia (SM) card, a Compact Flash (CF) card, a memory stick, a Secure Digital (SD) card, or a Universal Flash Storage (UFS).

The memory interface 140 may be a standard interface such as UFS, Serial Advanced Technology Attachment (SATA), Small Computer Small Interface (SCSI), Serial attached SCSI (SAS), embedded MultiMedia Card (eMMC), or NonVolatile Memory express (NVMe).

The system bus 105 may connect the CPU 110, the ROM 120, the RAM 130, and the memory interface 140 to one another.

Figure 2:
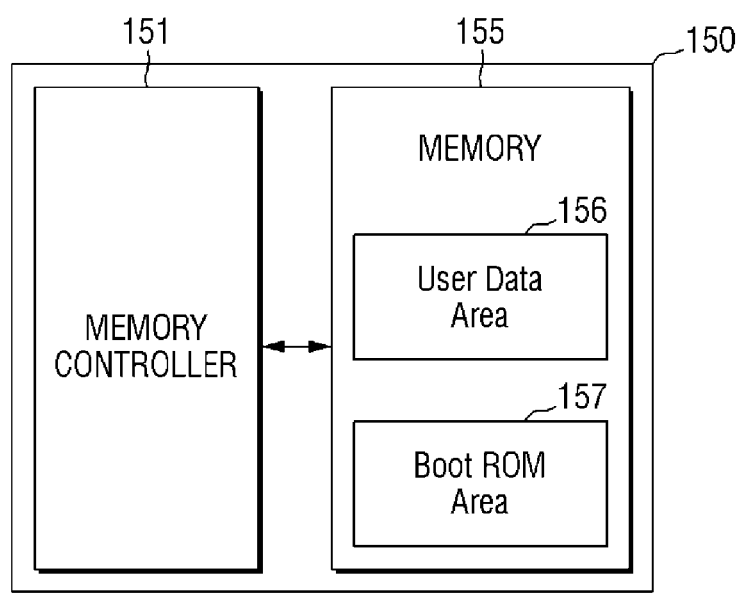
FIG. 2 is a block diagram illustrating a memory system of FIG. 1.

FIG. 2 is a block diagram illustrating the memory system of FIG. 1.

Referring to FIG. 2, the memory system 150 includes a memory controller 151 and a memory 155.

The memory controller 151 may control the general operations of the memory 155 such as read, write, and erase operations. The memory controller 151 may receive data, an address, and a command from the host device 100 and may control an operation of the memory 155 based on the received data, the received address, and the received command. The memory controller 151 may include firmware as software and a processor that executes the firmware. A processor used for the memory controller 151 may be, for example, a microprocessor or an application-specific integrated circuit (ASIC). All or part of methods attributed or attributable herein to the memory controller 151 may be implemented by the processor executing the firmware or other software.

The memory 155 may include a nonvolatile memory. Specifically, the memory 155 may include, for example, a NAND flash memory, a Vertical NAND (VNAND) memory, a NOR flash memory, a Phase-change RAM (PRAM), a Resistive RAM (RRAM), a Magnetoresistive RAM (MRAM), a Ferroelectric RAM (FRAM), or a Spin Transfer Torque RAM (STT-RAM), but the present disclosure is not limited thereto.

The memory 155 may include a user data area 156 and a boot ROM area 157. The user data area 156 may be an area that can be freely accessed by a user. That is, the user data area 156 may account for most of the area in which data is written and stored in the memory 155.

On the other hand, the boot ROM area 157 may be an area that cannot be accessed by the user. Thus, the boot ROM area 157 may be subjected to restricted access as compared to the user data area 156 which is freely accessible. The boot ROM area 157 may be a space in which a boot code for use in booting up the embedded system according to some embodiments of the present disclosure is stored and may be an area that cannot be arbitrarily changed by the user and can thus remain secure.

Figure 3:
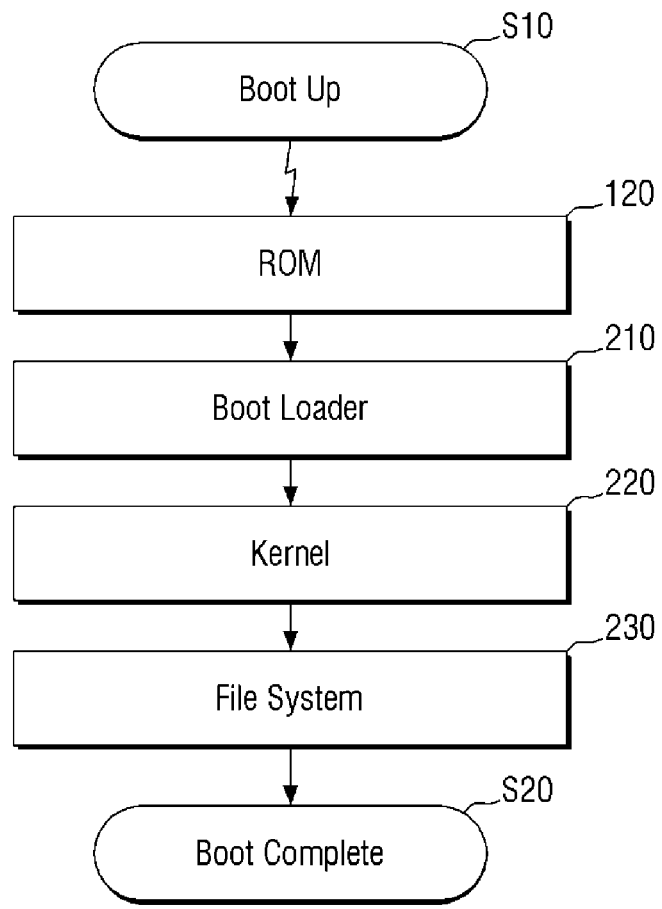
FIG. 3 is a block diagram illustrating a boot-up method the embedded system according to some embodiments of the present disclosure.

FIG. 3 is a block diagram illustrating a boot-up method of the embedded system according to some embodiments of the present disclosure.

Referring to FIGS. 1 and 3, the embedded system according to some embodiments of the present disclosure may be booted up (S10).

Boot-up may be initiated by an event such as applying power. Boot-up needs to be performed using secure boot-up in order to prevent firmware manipulated with an externally manipulated boot-up system from being loaded.

To this end, when boot-up begins, the ROM 120 verifies the integrity of a boot loader 210. The verification of the integrity of the boot loader 210 may be performed by determining whether a value provided by the software of the boot loader 210 differs from a predetermined value. That is, the integrity of the boot loader 210 may mean that the boot loader 210 is not changed by any external intervention.

Once the integrity of the boot loader 210 is verified, the boot loader 210 may be executed. The boot loader 210 may verify the integrity of a kernel 220. The kernel 220 may perform basic resource management such as processor management, memory management file system management, or device management.

Thereafter, the kernel 220 may verify the integrity of a file system 230. In this manner, boot-up may be performed by sequentially verifying the integrity of the boot loader 210, the kernel 220, and the file system 230. Accordingly, an Operating System (OS) may be loaded so that boot-up can be completed (S20) to support operations of the embedded system according to some embodiments of the present disclosure.

The integrity of the boot loader 210, the kernel 220, and the file system 230 may be sequentially verified based on the reliability of the ROM 120. That is, since the integrity of the ROM 120 is assumed to be ensured, secure boot-up can be performed once the integrity of the boot loader 210, the kernel 220, and the file system 230 is sequentially verified.

In a conventional embedded system, it is highly difficult to update the firmware of a ROM because of the hardware characteristics of a ROM. Thus, the firmware of a ROM can be easily protected against malicious code or external attacks. Therefore, the integrity of a ROM can be ensured.

However, due to the hardware characteristics of a ROM, it is also highly difficult to update a boot code of a ROM even when the boot code has vulnerabilities. Thus, the vulnerabilities of a ROM of an embedded system cannot be addressed without changing hardware.

On the other hand, the embedded system according to some embodiments of the present disclosure can facilitate update while maintaining the integrity of the ROM 120. This will hereinafter be described in detail.

Figure 4:
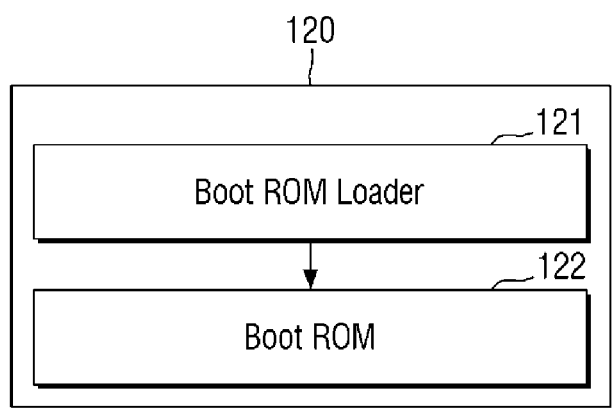
FIG. 4 is a block diagram illustrating operations of a Read-Only Memory (ROM) of FIG. 3.

FIG. 4 is a block diagram illustrating operations of the ROM of FIG. 3.

Referring to FIGS. 3 and 4, when a boot-up process begins, the ROM 120 may execute a boot ROM loader 121. The boot ROM loader 121 may load a boot ROM 122 from the outside. The boot ROM loader 121 may be software. The boot ROM 122 may be data for performing boot-up. The ROM 120 may boot up the embedded system according to some embodiments of the present disclosure via the boot ROM 122.

Figure 5:
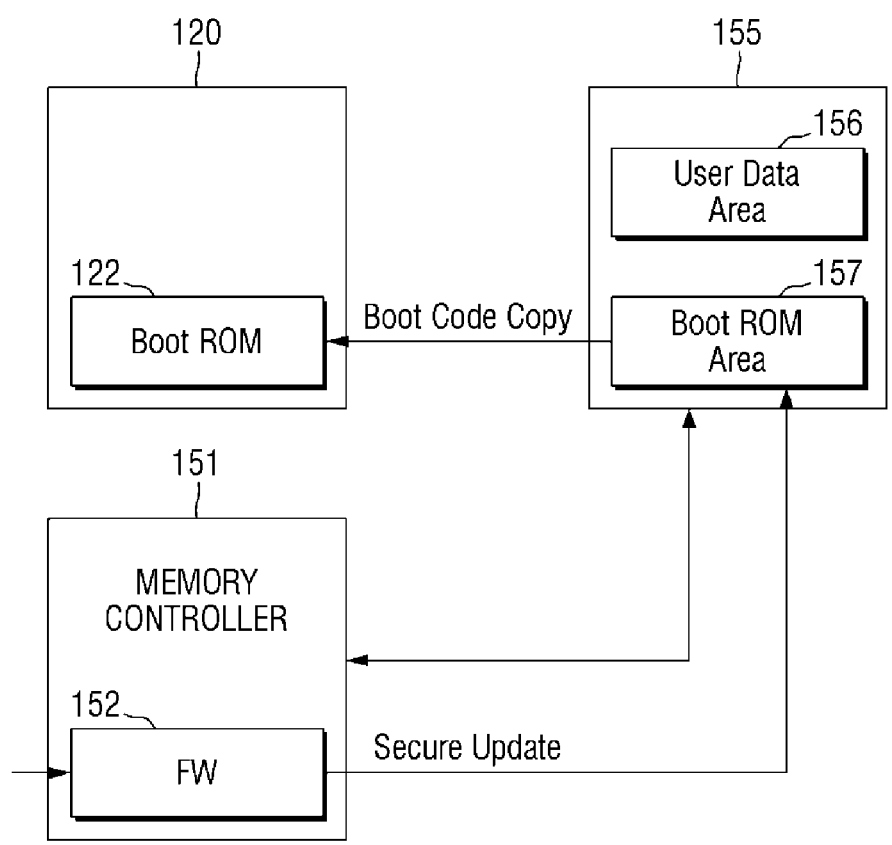
FIG. 5 is a block diagram illustrating how to read and update boot ROM code of the embedded system according to some embodiments of the present disclosure.

FIG. 5 is a block diagram illustrating how to read and update boot ROM code of the embedded system according to some embodiments of the present disclosure.

Referring to FIGS. 4 and 5, the ROM 120 may load the boot ROM 122 by reading the boot code from the boot ROM area 157 of the memory 155. That is, the ROM 120 does not include the boot code therein, but may use the boot code in boot-up by copying or loading the boot code from the boot ROM area 157 of the memory 155. The boot ROM 122 may perform or be used to perform boot-up using the boot code copied or loaded from the boot ROM area 157. Here, a bit indicating that the boot code is present in the boot ROM area 157 may be provided. Accordingly, the ROM 120 can determine or be used to determine, based on the bit, whether the boot code is present in the boot ROM area 157.

This is for facilitating update, instead of using the boot ROM 122, which is almost impossible to be updated without changing hardware.

The memory controller 151 may include firmware "FW" 152. The firmware 152 may be stored in a ROM separately included in the memory controller 151. The firmware 152 may refer to a micro-program that controls hardware. The firmware 152 may be software in terms of being a program, but can be distinguished from general application software in terms of being closely related to hardware. That is, the firmware 152 may have the characteristics of both software and hardware.

The firmware 152 of the memory controller 151 may perform secure update of the boot ROM area 157. Since secure update is performed by the firmware 152, update can be performed easily at low cost, as compared to the case of performing update by replacing hardware. Accordingly, the embedded system according to some embodiments of the present disclosure can easily address the vulnerabilities of the boot ROM 122, particularly, the inconvenience of replacing hardware to perform update.

Figure 6:
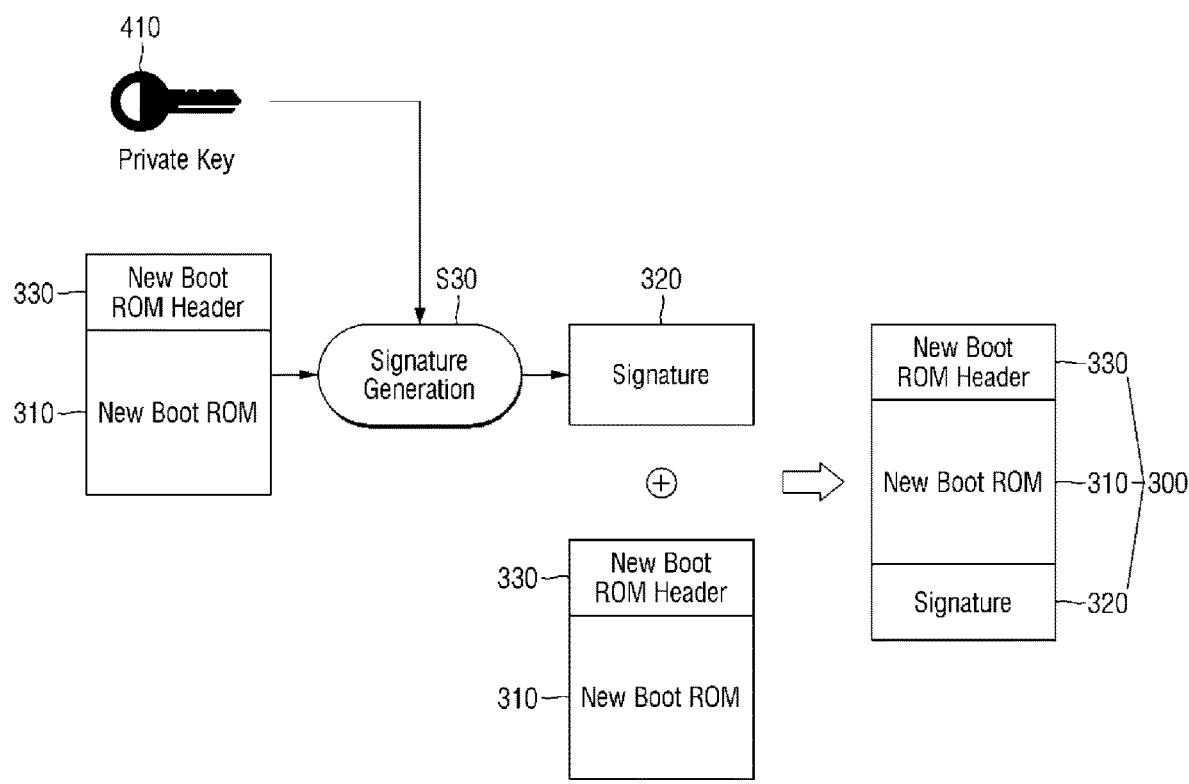
FIG. 6 is a schematic view illustrating how to generate the boot ROM code of the embedded system according to some embodiments of the present disclosure.

FIG. 6 is a schematic view illustrating how to generate the boot ROM code of the embedded system according to some embodiments of the present disclosure.

Referring to FIG. 6, a first boot code 300 may refer to a boot code that is newly updated. That is, after the first boot code 300 is updated, the embedded system according to some embodiments of the present disclosure may be booted up using the first boot code 300.

The first boot code 300 may include a first boot ROM image 310 labelled in FIG. 6 as "New Boot ROM", a first signature 320, and a first header 330 labelled in FIG. 6 as "New Boot ROM Header".

The first boot ROM image 310 may be updated boot ROM image data. The ROM 120 may perform boot-up using the first boot ROM image 310. The first boot ROM image 310 may be encrypted.

The first signature 320 may be created by a Digital Signature Algorithm (DSA). That is, the first signature 320 may be a digital signature corresponding to the first boot ROM image 310 and the first header 330.

The DSA may refer to an algorithm that creates a signature using a private key in given data. A third party can use a public key for verification to verify, through signature verification, whether data has been created by an authorized party, and this is as effective as signing a document in real life.

The first signature 320 may be created using a private key and using the first boot ROM image 310 and the first header 330 as data. Thus, the first signature 320 may include or be otherwise based on not only the first boot ROM image 310, but also the first header 330. The first signature 320 may verify, through a public key, that the first boot ROM image 310 and the first header 330 have been manufactured or otherwise created or initially provided by an authorized party. Thus, the first signature 320 may be a mechanism for authenticating the manufacturer or other type of creator or provider of the first boot ROM image 310 and ensuring the integrity of the first boot ROM image 310.

The first header 330 may account for the rest of the first boot code 300 and may include information regarding the first boot ROM image 310 and the first signature 320. The first header 330 includes version information of the first boot code 300, size information of the first boot code 300, an encryption key of the first boot code 300, an encryption algorithm of the first boot code 300, and a hash value of the public key, but the present disclosure is not limited thereto. Additionally, not all of the information noted above is necessarily included in a header such as the first header 330 in other embodiments. For example, in another embodiment the first header may include at least one of version information of the first boot code 300, size information of the first boot code 300, an encryption key of the first boot code 300, an encryption algorithm of the first boot code 300, and a hash value of the public key.

The version information of the first boot code 300 in the first header 330 may be used to prevent the first boot code 300 from rolling back or being rolled back to its previous version in a boot-up process. That is, it may be necessary to prevent the boot code from returning to a previous version by avoiding a new version with vulnerabilities addressed, and this is implemented by including the version information of the first boot code 300 in the first header 330.

The size information of the first boot code 300 in the first header 330 may be needed for the firmware 152 to write the first boot code 300 to the boot ROM area 157 for secure update.

The encryption key and the encryption algorithm of the first boot code 300 in the first header 330 may be information for decoding the first boot code 300 when the first boot code 300 is additionally encoded, or may be information regarding how to verify the first signature 320 in consideration that a method to verify the first signature 320 varies depending on how the first signature 320 is created.

The hash value of the public key in the first header 330 may perform additional verification of the public key. Thus, even when the public key is changed, security can be maintained.

The first signature 320 may be created (S30) through signature generation using the first boot ROM image 310, the first header 330, and a private key 410. The private key 410 is from the manufacturer or other type of creator or initial provider of the first boot ROM image 310 and the first header 330.

The signature generation process of FIG. 6 may use a DSA. After the creation of the first signature 320, the first boot ROM image 310, the first header 330 and the first signature 320 may be packaged together, thereby generating the first boot code 300.

Figure 7:
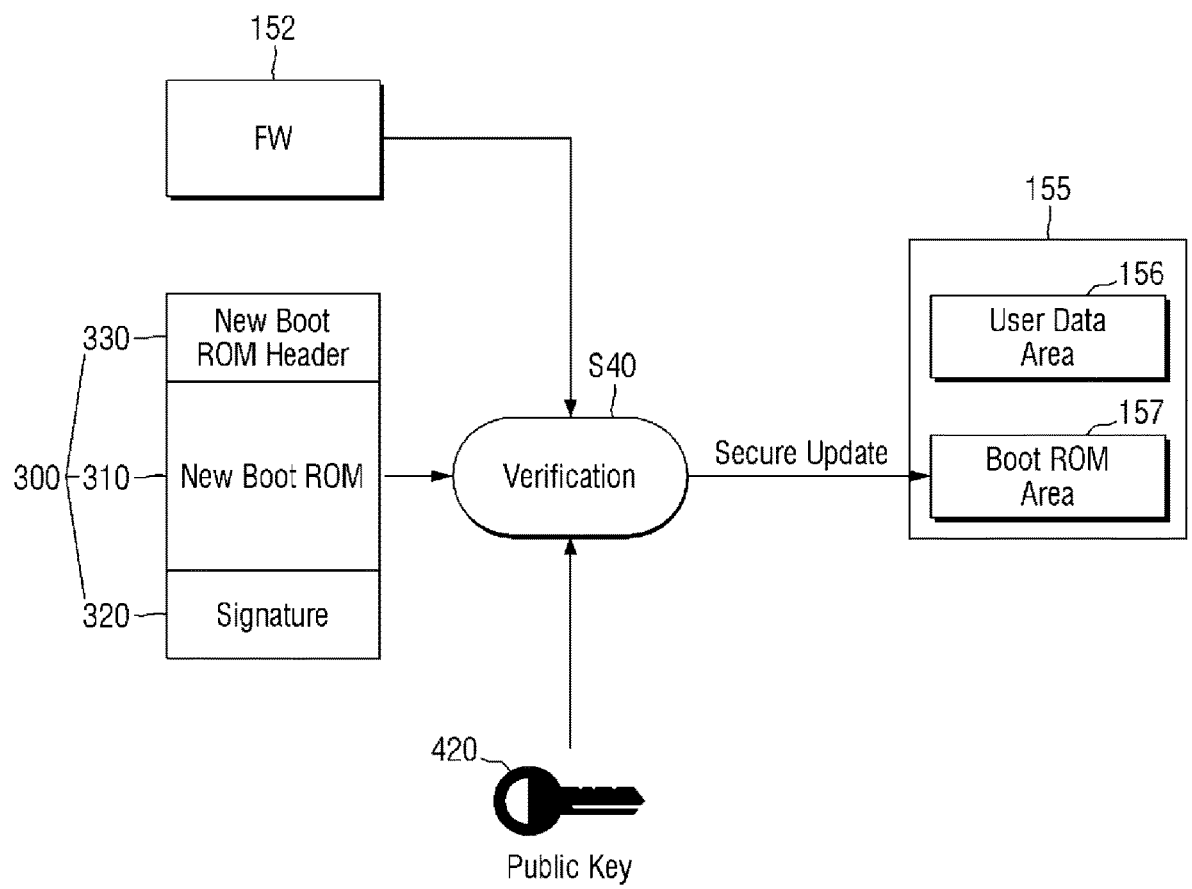
FIG. 7 is a block diagram illustrating how to perform verification during the update of the boot ROM of the embedded system according to some embodiments of the present disclosure, as illustrated in FIG. 5.

FIG. 7 is a block diagram illustrating how to perform verification during the update of the boot ROM of the embedded system according to some embodiments of the present disclosure, as illustrated in FIG. 5.

Referring to FIGS. 5 and 7, the first boot code 300 may be subjected to a verification step by the firmware 152 (S40).

In the verification step, a public key 420 may be used. The public key 420 may be a value for determining whether the first boot code 300 has been manufactured or otherwise created or initially provided by an authorized party. The public key 420 may be stored in advance in the firmware 152 or another storage space. That is, the manufacturer or other creator of the first boot code 300 may insert the public key 420 in the memory system 150 at the time of the manufacture of the memory system 150 of FIG. 1.

The first boot code 300 may be written to the boot ROM area 157 of the memory 155 as a secure update if the validity of the first boot code 300 is verified in the verification step. Alternatively, the first boot code 300 may be written to the boot ROM area 157 first, and then, the validity of the first boot code 300 may be verified. Still alternatively, the writing of the first boot code 300 to the boot ROM area 157 and the verification of the validity of the first boot code 300 may be performed in parallel.

Referring again to FIGS. 1 through 7, a boot ROM update method of the embedded system according to some embodiments of the present disclosure can secure the integrity of the ROM 120 using the above-described verification method.

That is, the embedded system according to some embodiments of the present disclosure can perform boot-up by writing the first boot code 300, which is secure-updated by a DSA, to the boot ROM area 157 of the memory 155 and copying the updated first boot code 300 to the ROM 120 during boot-up.

Accordingly, since the embedded system according to some embodiments of the present disclosure is maintained secure by a DSA when updating the boot ROM 122, the integrity of the ROM 120 can be maintained, and at the same time (i.e., partially or fully simultaneously), update for the vulnerabilities of the boot ROM 122 can be performed with ease.

Figure 8:
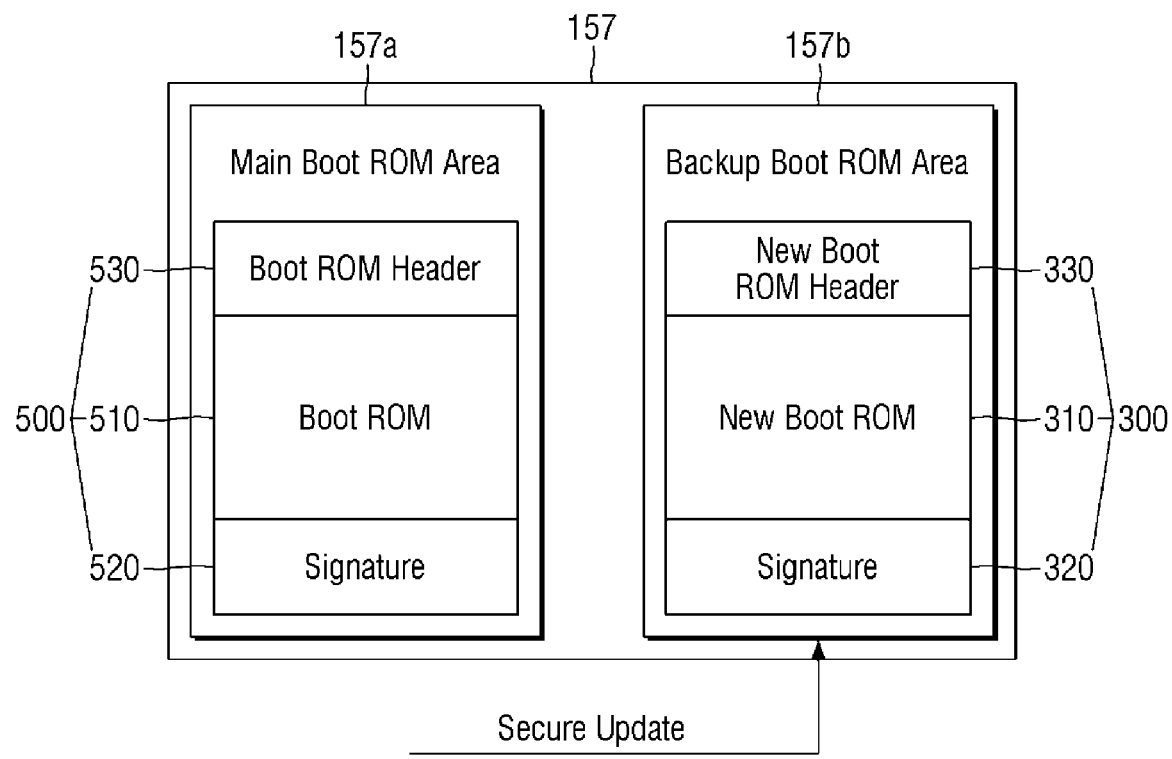
FIG. 8 is a block diagram illustrating a boot ROM area of a memory of the embedded system according to some embodiments of the present disclosure.

FIG. 8 is a block diagram illustrating the boot ROM area of the memory of the embedded system according to some embodiments of the present disclosure.

Referring to FIG. 8, the memory 155 may include the boot ROM area 157 with a first area 157a and a second area 157b. Here, the first area 157a may be a main boot ROM area, and the second area 157b may be a backup boot ROM area.

A second boot code 500 may be stored in the first area 157a. The first area 157a is an area into which the ROM 120 of FIG. 5 loads a boot code during boot-up, and boot-up may be performed by copying the second boot code 500 to the ROM 120.

The second boot code 500 may include a second boot ROM image 510 labelled in FIG. 8 as "Boot ROM", a second signature 520, and a second header 530 labelled in FIG. 8 as "Boot ROM Header". The second signature 520 is for verifying the second boot code 500, and the second header 530 may include detailed information regarding the second boot code 500.

The first boot code 300 that is newly secure-updated may be written to the second area 157b. That is, the first boot code 300 may be written to the second area 157b, which is a backup boot ROM area, rather than to the first area 157a, which is a main boot ROM area that is readily used in boot-up.

Figure 9:
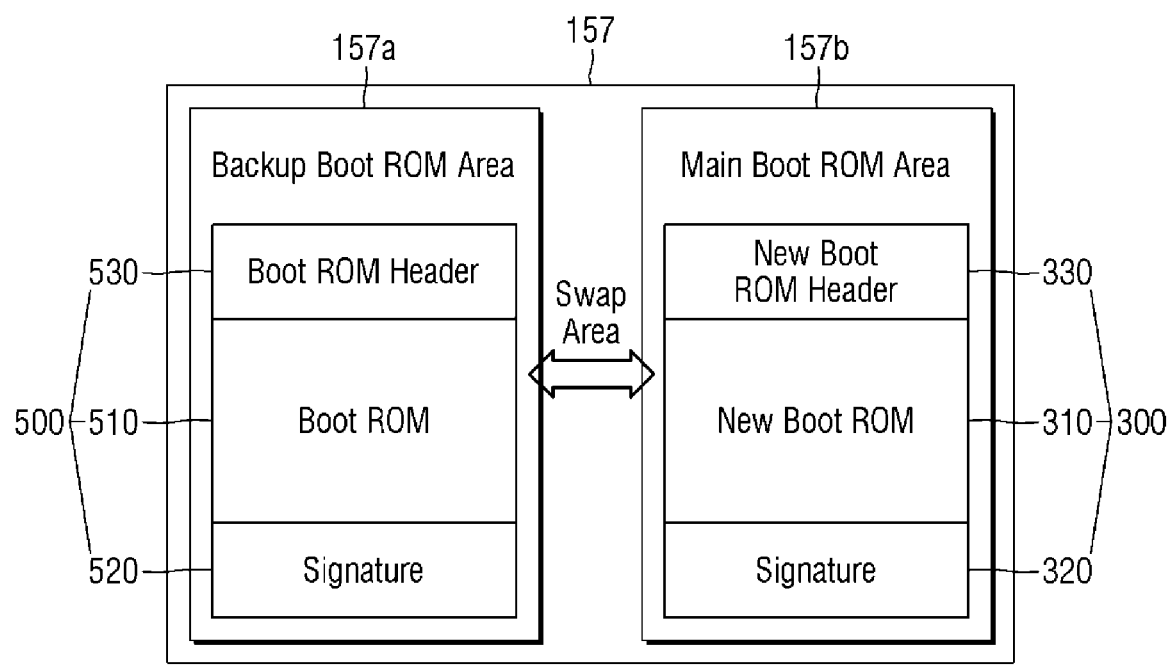
FIG. 9 is a block diagram illustrating how to perform a swap operation in the boot ROM area of FIG. 8.

FIG. 9 is a block diagram illustrating how to perform a swap operation in the boot ROM area of FIG. 8.

Referring to FIG. 9, once the validity of the first boot code 300 is verified through the verification of the first signature 320 and the first boot code 300 is written to the second area 157b, the first area 157a and the second area 157b may be swapped.

Here, the term "swap" means that the first area 157a and the second area 157b are changed to each other so that the first area 157a becomes a backup and the second area 157b becomes a main boot ROM area, respectively. This may therefore mean logically exchanging the assigned responsibility of or use of the first area 157a and the second area 157b, exchanging substantive information already stored in or to be stored in the physical memory locations for the first area 157a and the second area 157b, exchanging the type of or version of substantive information to be stored in the first area 157a and the second area 157b, or otherwise exchanging characteristic features of the first area 157a and the second area 157b. Effectively, the first boot code 300 is disposed in the first area 157a after the swapping and as a result of the swapping.

Whenever update occurs, the swap of the first area 157a and the second area 157b may be performed so that the first area 157a and the second area 157b may alternately become main boot ROM areas.

When the second area 157b becomes a main boot ROM area, the first boot code 300 in the second area 157b may be copied to the ROM 120 during boot-up. That is, the embedded system according to some embodiments of the present disclosure may be booted up by the first boot code 300.

The swap of the first area 157a and the second area 157b may be performed by exchanging the logical addresses of the first area 157a and the second area 157b. Alternatively, an address designated by the boot ROM loader 121 of the ROM 120 to load the boot ROM 122 may be changed from the address of the first area 157a to the address of the second area 157b in a first instantiation, and then back in the next instantiation.

According to some embodiments of the present disclosure, since a boot code resides on the outside of the ROM 120, rather than on the inside of the ROM 120, the update of the boot ROM 122 can be facilitated. Accordingly, when the boot ROM 122 is found vulnerable, the boot ROM 122 can be updated simply by the firmware 152 at low cost.

A boot ROM update method of an embedded system according to some embodiments of the present disclosure will hereinafter be described with reference to FIGS. 1, 8, 9, and 10. Descriptions of elements or features that have already been described above with regard to the embodiment of FIGS. 1 through 9 will be omitted or at least simplified.

Figure 10:
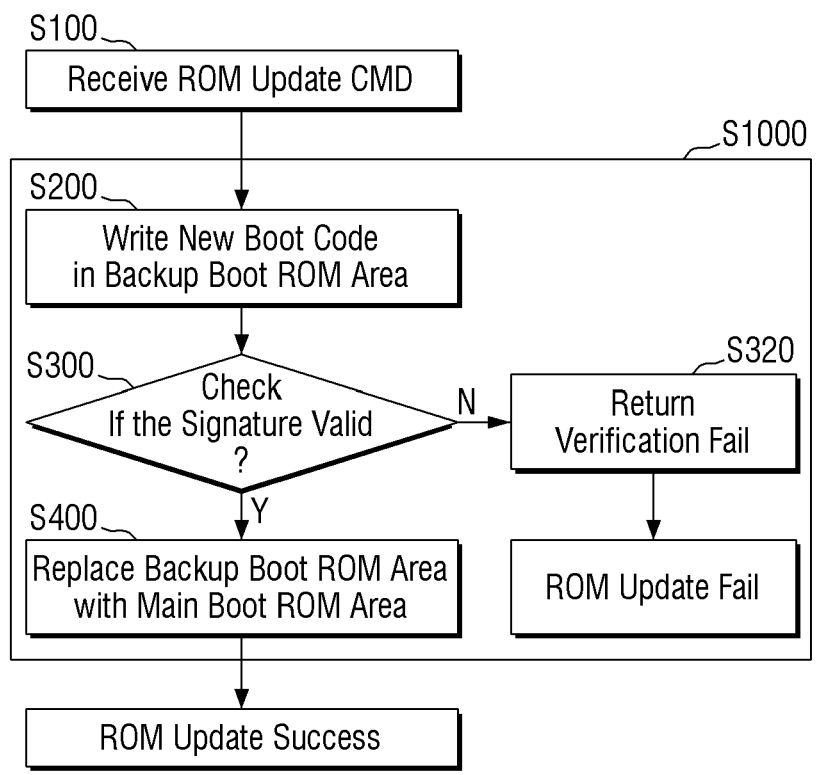
FIG. 10 is a flowchart illustrating a boot ROM update method of an embedded system according to some embodiments of the present disclosure.

FIG. 10 is a flowchart illustrating a boot ROM update method of an embedded system according to some embodiments of the present disclosure.

Referring to FIG. 10, a ROM update command is received (S100).

Specifically, referring to FIG. 1, the ROM update command may be transmitted at S100 from the host device 100 and received by the memory system 150.

Referring again to FIG. 10, boot ROM update is performed (S1000).

Specifically, a new boot code is written to a backup boot ROM area (S200).

Referring to FIG. 8, the memory 155 includes the first area 157a and the second area 157b. Here, the first area 157a may be a main boot ROM area, and the second area 157b may be a backup boot ROM area. A first boot code 300, which is newly secure-updated, may be written to the second area 157b at S200.

Referring again to FIG. 10, the validity of a signature is checked (S300).

Specifically, referring to FIG. 7, the first boot code 300 may be subjected to a verification step by the firmware 152 (S40).

In the verification step in S300, the public key 420 may be used. The public key 420 may be a value for determining whether the first boot code 300 has been manufactured or otherwise created or initially provided by an authorized party. The public key 420 may be stored in advance in the firmware 152 or another storage space. That is, the manufacturer or other type of creator of the first boot code 300 may insert the public key 420 in the memory system 150 at the time of the manufacture of the memory system 150 of FIG. 1.

Referring again to FIG. 10, S300 may be performed after S200, but the present disclosure is not limited thereto. Alternatively, the validity of the signature may be checked first, and a new boot code may be written to the backup boot ROM area only if the signature is valid such that writing the new boot code to the backup boot ROM area is contingent upon the signature being valid. Still alternatively, the writing of the new boot code and the checking of the validity of the signature may be performed in parallel.

If the signature is invalid (S300=No), "Verification Fail" is returned (S320).

In this case, the ROM update may fail.

On the other hand, if the signature is valid, the backup boot ROM area and the main boot ROM area may be swapped (S400).

Specifically, referring to FIG. 9, if the validity of the first boot code 300 is verified through the verification of the first signature 320 and the first boot code 300 is written to the second area 157b, the first area 157a and the second area 157b may be swapped (S400).

In this case, the ROM update may be successful.

According to some embodiments of the present disclosure, the backup boot ROM area may be written with some trash values or "0x00" value after successful the ROM update.

A boot ROM update method of an embedded system according to some embodiments of the present disclosure will hereinafter be described with reference to FIGS. 8, 10, and 11. Descriptions of elements or features that have already been described above with regard to the embodiments of FIGS. 1 through 10 will be omitted or at least simplified.

Figure 11:
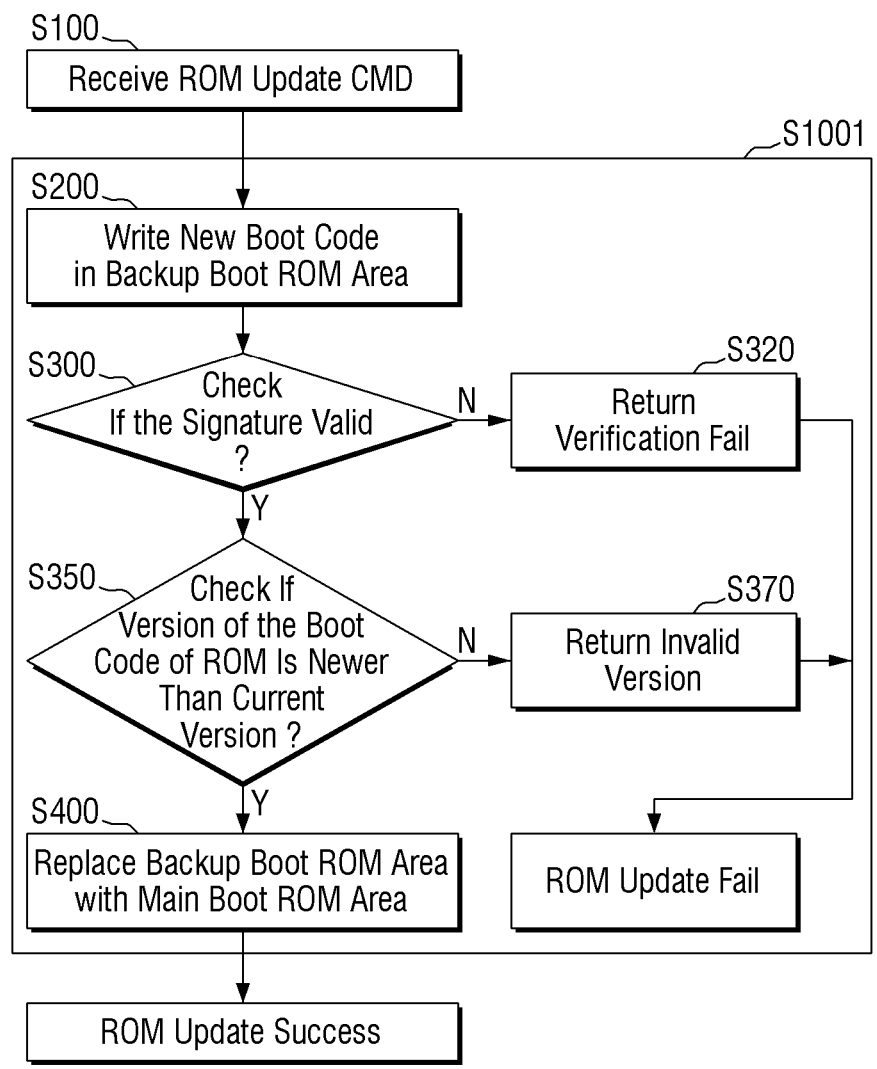
FIG. 11 is a flowchart illustrating a boot ROM update method of an embedded system according to some embodiments of the present disclosure.

FIG. 11 is a flowchart illustrating a boot ROM update method of an embedded system according to some embodiments of the present disclosure.

Referring to FIG. 11, after the receipt of a ROM update command (S100), boot ROM update is performed (S1001).

Specifically, S1001 of FIG. 11 is substantially the same as S1000 of FIG. 10, except that a few additional steps are added thereto, and will hereinafter be described, focusing mainly on the additional steps.

After the verification of the validity of a signature (S300), a determination is made as to whether the version of a boot code of a ROM is newer than a current version (S400) if the signature is valid (S300=Yes).

Specifically, referring to FIG. 8, the first header 330 includes version information of the first boot code 300, and the second header 530 includes version information of the second boot code 500.

If the vulnerabilities of the boot ROM 122 are addressed by the supplementations of/in a new version of the boot code, attacks may still be launched using the vulnerabilities of the boot ROM 122 in a previous version of the boot code if the boot ROM 122 can be rolled back to the previous version during an update. Thus, the embodiment of FIG. 11 can prevent the boot ROM 122 from rolling back to a previous version of the boot code of the ROM during update and can thus prevent security from weakening.

Referring again to FIG. 11, if the version of the boot code of the ROM is not newer than the current version (S350=No), "Invalid Version" is returned (S370).

In this case, ROM update may fail.

On the other hand, if the version of the boot code of the ROM is newer than the current version (S350=Yes), a backup boot ROM area and a main boot ROM area are swapped (S400).

In this manner, the embodiment of FIG. 11 can prevent the boot code copy in the boot ROM 122 from rolling back to a previous version and can thus further strengthen security.

A boot ROM update method of an embedded system according to some embodiments of the present disclosure will hereinafter be described with reference to FIGS. 5, 8, and 10 through 12. Descriptions of elements or features that have already been described above with regard to the embodiments of FIGS. 1 through 11 will be omitted or at least simplified.

Figure 12:
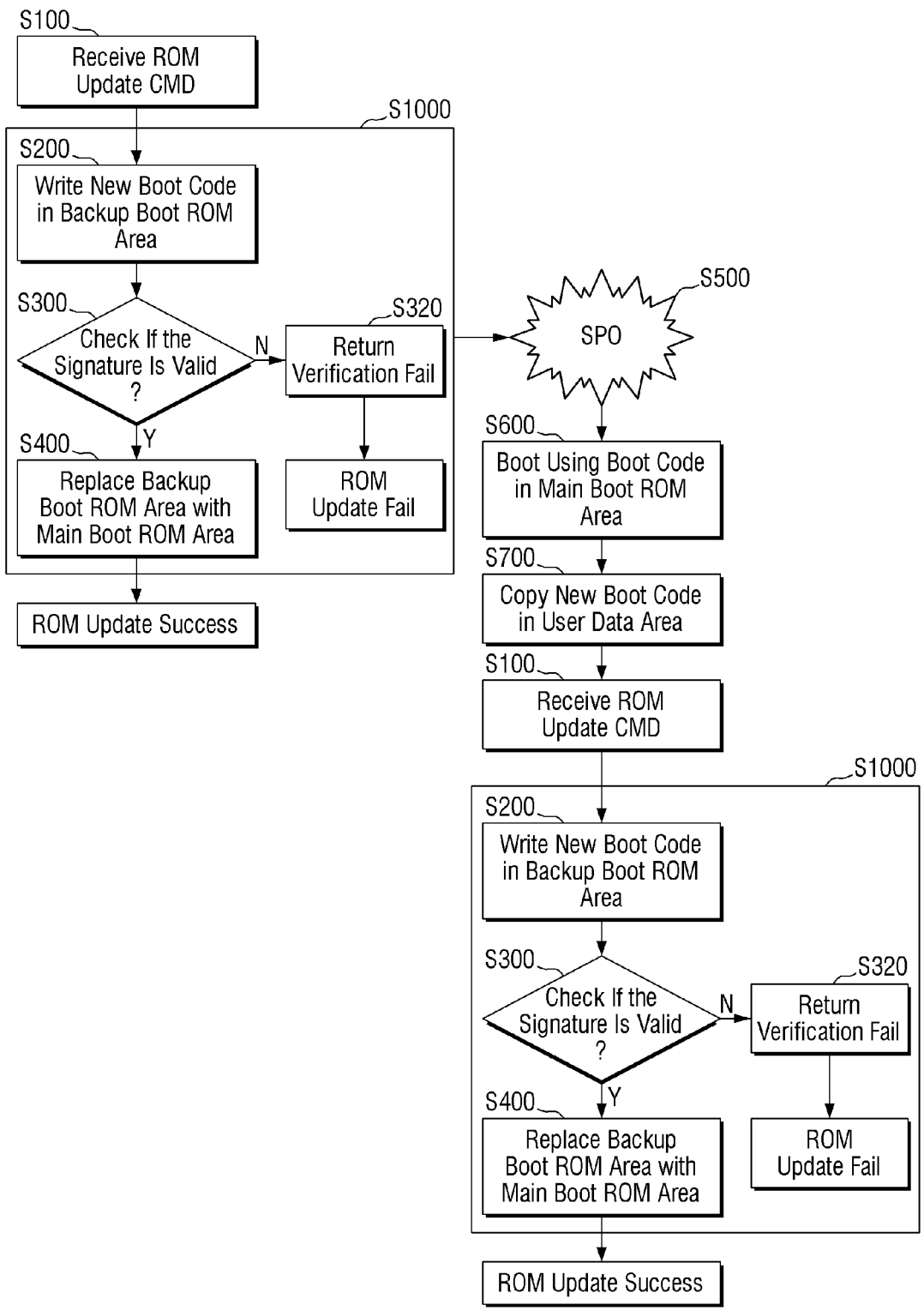
FIG. 12 is a flowchart illustrating a boot ROM update method of an embedded system according to some embodiments of the present disclosure.

FIG. 12 is a flowchart illustrating a boot ROM update method of an embedded system according to some embodiments of the present disclosure.

Referring to FIG. 12, after the receipt of a ROM update command (S100), boot ROM update is performed (S1000).

S1000 of FIG. 12 is the same or substantially the same as S1000 of FIG. 10. Obviously, S1001 of FIG. 11 may also replace S1000 of FIG. 10 or FIG. 12.

During S1000 in FIG. 10 or FIG. 12 or during S1001 in FIG. 11, a Sudden Power-Off (SPO) may occur (S500).

Then, boot-up is performed using a boot code in a main boot ROM area (S600).

Specifically, referring to FIG. 8, the memory 155 includes the boot ROM area 157 with the first area 157a and the second area 157b. Here, the first area 157a may be a main boot ROM area, and the second area 157b may be a backup boot ROM area. The second boot code 500 may be stored in the first area 157a. The first area 157a is an area into which the ROM 120 of FIG. 5 loads a boot code during boot-up, and boot-up may be performed by copying the second boot code 500 to the ROM 120.

Referring again to FIG. 12, a new boot code for a ROM is copied to a user data area (S700) sometime after the boot-up is performed using the boot code in the main boot ROM area at S600.

Specifically, referring to FIG. 5, the memory 155 may include the user data area 156 and the boot ROM area 157. The user data area 156 may be an area that can be freely accessed by a user. That is, the user data area 156 may account for most of the area in which data is written and stored in the memory 155.

If a sudden power-off (SPO) occurs, ROM update may not be completed, and a new boot code, i.e., the first boot code 300, may not be properly copied to the boot ROM area 157 of the memory 155. Thus, the first boot code 300 may be temporarily copied to the user data area 156 at S700 before a verification process.

Referring again to FIG. 12, a new ROM update command is received (S100) after the first boot code 300 is temporarily copied to the user data area 156 at S700.

This may mean that update is not performed until a ROM update command is received at S100, such that the update is contingent upon receipt of the new ROM update command at S100 after the first boot code 300 is temporarily copied to the user data area 156 at S700.

Thereafter, boot ROM update is performed (S1000).

In this case, the first boot code 300 may be received from the user data area 156.

That is, since the main boot ROM area, which is needed in an actual boot-up, and the backup boot ROM area, which is used during update, are separated, an embedded system can be properly booted up without any particular problems, even when a sudden power-off (SPO) occurs.

A boot ROM update method of an embedded system according to some embodiments of the present disclosure will hereinafter be described with reference to FIGS. 7 through 13. Descriptions of elements or features that have already been described above with regard to the embodiments of FIGS. 1 through 12 will be omitted or at least simplified.

Figure 13:
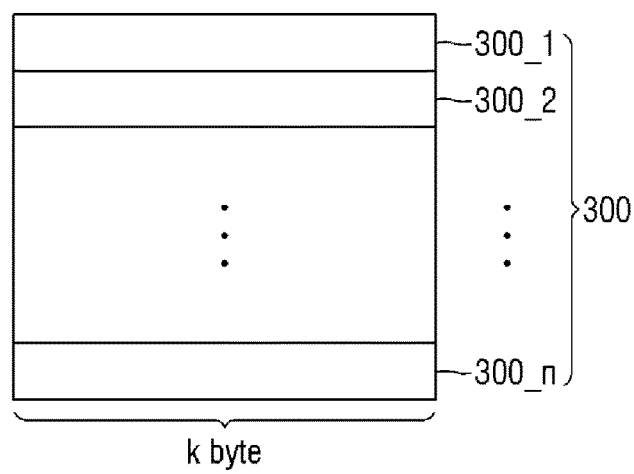
FIG. 13 is a flowchart illustrating a boot ROM update method of an embedded system according to some embodiments of the present disclosure.

FIG. 13 is a flowchart illustrating a boot ROM update method of an embedded system according to some embodiments of the present disclosure.

Referring to FIGS. 7 and 13, a verification step (S40) may be performed using a hash function. The hash function may be of one of a variety of types, and the standard size of data calculated by a particular hash function may be determined. For example, if the standard size of data calculated by the particular hash function is 32 bytes, the predetermined hash function may calculate a hash value by dividing data into 32-byte segments. In embodiments herein, writing the boot code to the backup boot ROM area may be performed in units of segments such as the 32-byte segments. Writing the boot code to the backup boot ROM area in units of the segments may be performed fully or partly simultaneously with calculating the hash value of the boot code by dividing the boot code into the segments of the standard size of data calculated by the hash function. In other words, the writing and calculating may both be performed in a single process such as at S40, without other process functions described herein intervening.

The first boot code 300 may include first block 300_1 through n-th blocks 300_n. The first block 300_1 through n-th block 300_n may have the same size of K bytes. Here, K bytes may be the standard size of data calculated by the hash function used in the verification step (S40). That is, the first boot code 300 may be divided in accordance with the standard size of data calculated by the hash function used in the verification step (S40).

The calculation of data by the hash function may be performed as the verification step (S40) while writing each of the first block 300_1 through n-th block 300_N of the first boot code 300 to the boot ROM area 157. In this case, update can be effectively performed as compared to the case of performing the verification step (S40) by writing the first boot code 300 at once and then dividing the first boot code 300.

That is, since the calculation of data by the hash function is performed while writing the first boot code 300, i.e., verification and write operations are performed at the same time (partially or fully simultaneously), the speed of update can be considerably improved.

A boot ROM update method of an embedded system according to some embodiments of the present disclosure will hereinafter be described with reference to FIGS. 5 and 14 through 16. Descriptions of elements or features that have already been described above with regard to the embodiments of FIGS. 1 through 13 will be omitted or at least simplified.

Figure 14:
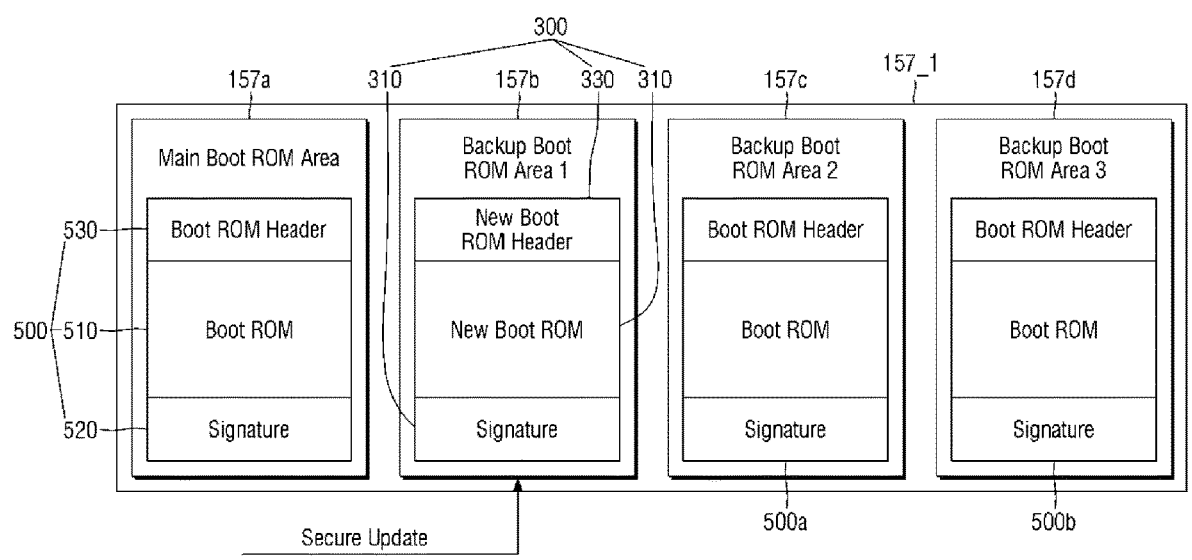
FIG. 14 is a block diagram illustrating a boot ROM area of a memory of an embedded system according to some embodiments of the present disclosure.

FIG. 14 is a flowchart illustrating a boot ROM update method of an embedded system according to some embodiments of the present disclosure.

Referring to FIGS. 5 and 14, a boot ROM area 157_1 may include a first area 157a, a second area 157b, a third area 157c, and a fourth area 157d. Here, the first area 157a may be a main boot ROM area, and the second area 157b, the third area 157c, and the fourth area 157d may be backup boot ROM areas. Specifically, the second area 157b, the third area 157c, and the fourth area 157d may be defined as first, second, and third backup boot ROM areas, respectively.

FIG. 14 illustrates that one main boot ROM area and three backup boot ROM areas are provided, but the present disclosure is not limited thereto. That is, the number of backup boot ROM areas provided may vary.

A second boot code 500 may be stored in the first area 157a. The first area 157a is an area into which the ROM 120 loads a boot code during boot-up, and boot-up may be performed by copying the second boot code 500 to the ROM 120.

A first boot code 300, which is newly secure-updated, may be written to the second area 157b. That is, the first boot code 300 may be written to the second area 157b, which is a backup boot ROM area, rather than to the first area 157a, which is a main boot ROM area that is readily used in boot-up.

A third boot code 500a, which is a copy of the second boot code 500 present in the main boot ROM area, i.e., the first area 157a, may be stored in the third area 157c. The third boot code 500a may be substantially the same as the second boot code 500.

A fourth boot code 500b, which is another copy of the second boot code 500 present in the main boot ROM area, i.e., the first area 157a, may be stored in the fourth area 157d. The fourth boot code 500b may be substantially the same as the second boot code 500, and implicitly as the third boot code 500a.

Accordingly, the second boot code 500, the third boot code 500a, and the fourth boot code 500b may all be substantially the same. If the boot ROM area 157_1 is partially damaged so that the second boot code 500 in the main boot ROM area is damaged, the third boot code 500a or the fourth boot code 500b in the third area 157c or the fourth area 157d may be used in boot-up.

Therefore, even when the boot ROM area 157_1 is partially damaged, boot-up can be stably performed, and the reliability of an entire embedded system can be improved.

Figure 15:
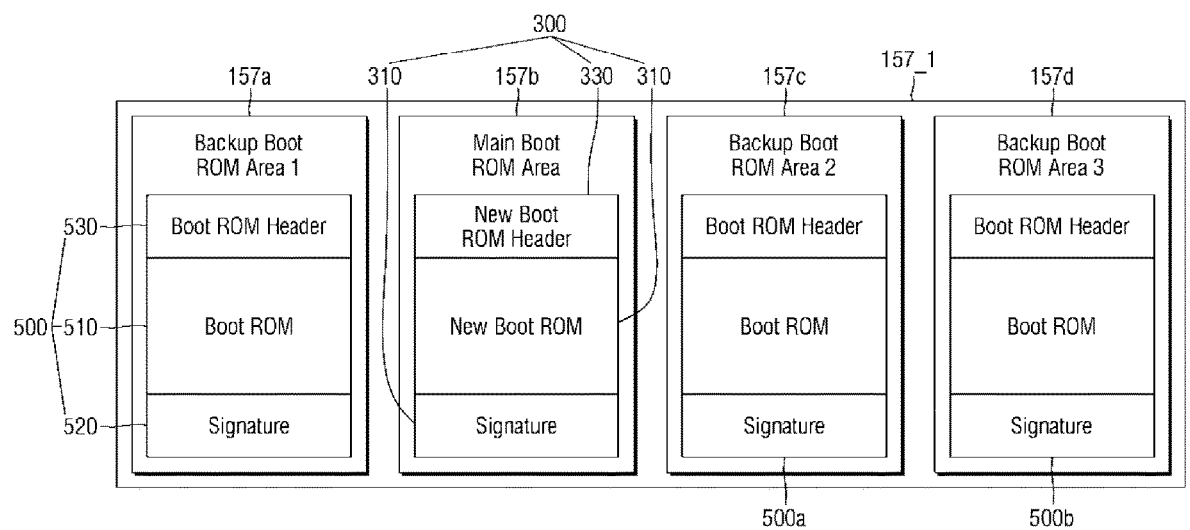
FIG. 15 is a block diagram illustrating how to perform a swap operation in the boot ROM area of FIG. 14.
Figure 16:
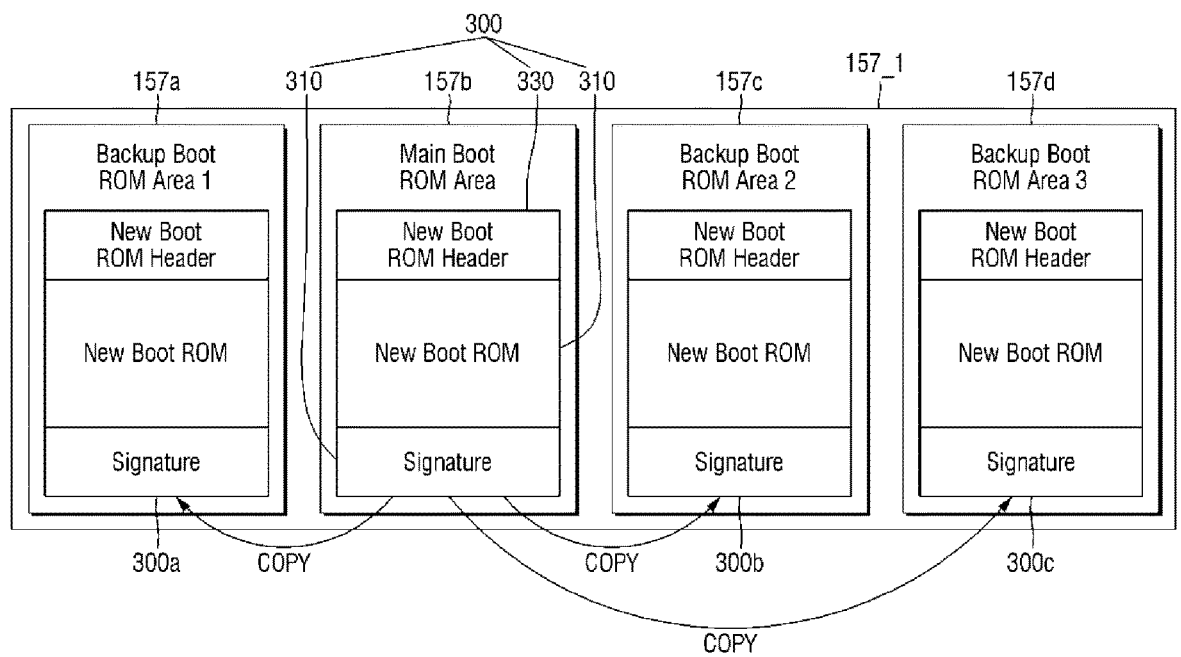
FIG. 16 is a block diagram illustrating how to perform a copy operation in the boot ROM area of FIG. 14.

FIG. 15 is a block diagram illustrating how to perform a swap operation in the boot ROM area of FIG. 14, and FIG. 16 is a block diagram illustrating how to perform a copy operation in the boot ROM area of FIG. 14.

Referring to FIG. 15, once the validity of the first boot code 300 is verified through the verification of a first signature 320 and the first boot code 300 is written to the second area 157b, the first area 157a and the second area 157b may be swapped. Swapping here may again mean logically exchanging the assigned responsibility of or use of the first area 157a and the second area 157b, exchanging substantive information already stored in or to be stored in the physical memory locations for the first area 157a and the second area 157b, exchanging the type of or version of substantive information to be stored in the first area 157a and the second area 157b, or otherwise exchanging characteristic features of the first area 157a and the second area 157b. Effectively, the first boot code 300 is disposed in the first area 157a after the swapping and as a result of the swapping.

Accordingly, the first area 157a may become the first backup boot ROM area, and the second area 157b may become the main boot ROM area. In this case, the third boot code 500a, which is the same as the second boot code 500, may remain in the third area 157c, which is the second backup boot ROM area. The fourth boot code 500b, which is also the same as the second boot code 500, may remain in the fourth area 157d, which is the third backup boot ROM area.

Thereafter, referring to FIG. 16, the first boot code 300 in the second area 157b may be copied to each of the first area 157a, the third area 157c, and the fourth area 157d.

As a result, a fifth boot code 300a may be stored in the first area 157a, a sixth boot code 300b may be stored in the third area 157c, and a seventh boot code 300c may be stored in the fourth area 157d. The fifth boot code 300a, the sixth boot code 300b, and the seventh boot code 300c may be substantially the same as the first boot code 300.

The copying of the first boot code 300 to each of the first area 157a, the third area 157c, and the fourth area 157d may not necessarily be performed after an update. That is, the copying of the first boot code 300 to each of the first area 157a, the third area 157c, and the fourth area 157d may be performed when the workload of an embedded system or a memory system 150 of the embedded system is small.

Accordingly, even if the boot ROM area 157_1 is partially damaged so that the second area 157b is damaged, boot-up can be stably performed because the first boot code 300, which is updated, is stored in the first area 157a, the third area 157c, and the fourth area 157d as the fifth boot code 300a, the sixth boot code 300b, and the seventh boot code 300c.

An embedded system according to some embodiments of the present disclosure will hereinafter be described. Descriptions of elements or features that have already been described above with regard to the embodiments of FIGS. 1 through 16 will be omitted or at least simplified.

Figure 17:
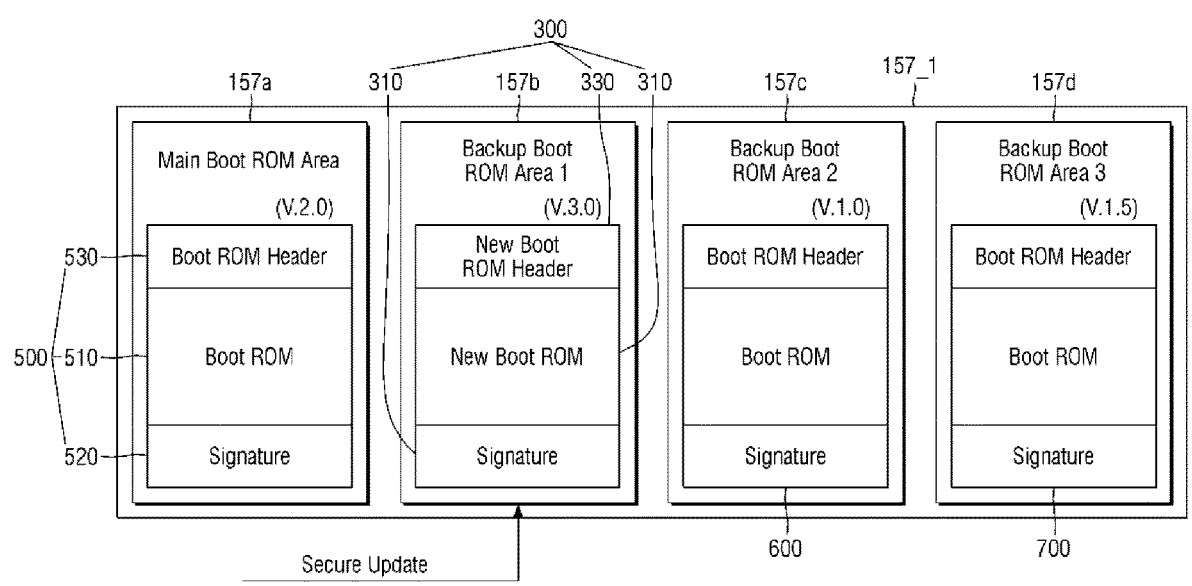
FIG. 17 is a block diagram illustrating a boot ROM area of a memory of an embedded system according to some embodiments of the present disclosure.

FIG. 17 is a block diagram illustrating a boot ROM area of a memory of an embedded system according to some embodiments of the present disclosure.

Referring to FIG. 17, a boot ROM area 157_1 may include boot codes of different versions in first area 157a, the second area 157b, the third area 157c, and the fourth area 157d.

Specifically, a second boot code 500 (of, for example, version 2.0), which is currently being used in boot-up, may be stored in the first area 157a, and a first boot code 300 (of, for example, version 3.0) may be written to the second area 157b through secure update.

Boot codes of previous versions may be stored in the third area 157c and the fourth area 157d. For example, an eighth boot code 700 of version 1.0 may be stored in the third area 157c, and a ninth boot code 800 of version 1.5 may be stored in the fourth area 157d.

This is for facilitating roll-back in case there is a compatibility issue between different versions. That is, the embedded system according to some embodiments of the present disclosure can easily roll back to a boot ROM of a previous version and can thus easily address this compatibility issue.

What is claimed is:

1. A boot Read-Only Memory (ROM) update method of an embedded system including a non-volatile memory, which includes a user data area and a boot ROM area that includes a first area and a second area, and a ROM, which is separate from the boot ROM area and which copies a first boot code from the boot ROM area during boot-up, the boot ROM update method comprising:

writing, from firmware of a memory controller that controls the non-volatile memory, a second boot code to the second area of the boot ROM area in response to a first ROM update command, the second boot code including a second boot ROM image and a second signature for the second boot ROM image;

verifying validity of the second signature written to the second area of the boot ROM area;

if the second signature written to the second area of the boot ROM area is valid, swapping the first area and the second area of the boot ROM area, and before the swapping the first area and the second area of the boot ROM area, if a sudden power-off (SPO) occurs, detecting that power has been applied to initiate boot-up, performing boot-up using the first boot code, and writing the second boot code to the user data area in the non-volatile memory, wherein the first boot code is disposed in the first area and includes a first boot ROM image and a first signature for the first boot ROM image.

2. The boot ROM update method of claim 1, wherein the first boot code includes a first header, which includes detailed information regarding the first boot code, and the second boot code includes a second header, which includes detailed information regarding the second boot code.

3. The boot ROM update method of claim 2, wherein the first header includes at least one of version information of the first boot code, size information of the first boot code, an encryption key of the first boot code, an encryption algorithm of the first boot code, and a hash value of a public key, and the second header includes at least one of version information, size information, an encryption key, and an encryption algorithm of the second boot code and the hash value of the public key.

4. The boot ROM update method of claim 3, further comprising, before the swapping the first area and the second area of the boot ROM area:
if the second signature is valid, determining whether a version of the second boot code is newer than a version of the first boot code based on the first header and the second header; and
if the version of the second boot code is newer than the version of the first boot code, swapping the first area and the second area of the boot ROM area.

5. The boot ROM update method of claim 3, further comprising, before the verifying the validity of the second signature:
verifying the public key using the hash value of the public key.

6. The boot ROM update method of claim 1, wherein
the embedded system includes the memory controller, which includes the firmware that controls the non-volatile memory,
a public key of a Digital Signature Algorithm (DSA) is stored in the firmware, and
the verifying the validity of the second signature, comprises verifying the validity of the second signature using the public key.

7. The boot ROM update method of claim 6, wherein the second signature is created using a private key of the DSA and the second boot ROM image.

8. The boot ROM update method of claim 1, wherein performing boot-up using the first boot code, and writing the second boot code to the user data area in the non-volatile memory before the swapping the first area and the second area of the boot ROM area further comprises:
writing the second boot code to the second area of the boot ROM area in response to a second ROM update command;
verifying the validity of the second signature; and
if the second signature is valid, swapping the first area and the second area of the boot ROM area of the boot ROM area.

9. The boot ROM update method of claim 8, wherein the boot-up comprises executing, by the ROM, a boot loader by verifying integrity of the boot loader, verifying, by the boot loader, integrity of a kernel, and verifying, by the kernel, integrity of a file system.

10. The boot ROM update method of claim 9, wherein the executing, by the ROM, the boot loader comprises executing, by the ROM, a boot ROM loader and loading, by the boot ROM loader, the first boot code from the first area.

11. A boot Read-Only Memory (ROM) update method of an embedded system including a non-volatile memory, which includes a user data area and a boot ROM area, and a ROM, which copies a first boot code from a main boot ROM area of the boot ROM area during boot-up, the boot ROM update method, comprising:
receiving a ROM update command;
writing, from firmware of a memory controller, a second boot code to a backup boot ROM area of the boot ROM area of the non-volatile memory;
verifying validity of the second boot code written to the backup boot ROM area of the boot ROM area using a Digital Signature Algorithm (DSA);
if the second boot code written to the backup boot ROM area of the boot ROM area is valid, changing the backup boot ROM area of the boot ROM area into a main boot ROM area of the boot ROM area, and
before changing the backup boot ROM area of the boot ROM area into a main boot ROM area of the boot ROM area, if a sudden power-off (SPO) occurs, detecting that power has been applied to initiate boot-up, performing boot-up using the first boot code, and writing the second boot code to the user data area in the non-volatile memory.

12. The boot ROM update method of claim 11, wherein the verifying the validity of the second boot code comprises calculating a hash value of the second boot code.

13. The boot ROM update method of claim 12, wherein the calculating the hash value of the second boot code comprises calculating the hash value of the second boot code by dividing the second boot code into segments of a standard size of data calculated by a hash function.

14. The boot ROM update method of claim 13, wherein the writing the second boot code to the backup boot ROM area comprises writing the second boot code to the backup boot ROM area in units of the segments.

15. The boot ROM update method of claim 14, wherein the writing the second boot code to the backup boot ROM area in units of the segments and the calculating the hash value of the second boot code by dividing the second boot code into the segments of the standard size of data calculated by a hash function are performed simultaneously.

16. A boot Read-Only Memory (ROM) update method of an embedded system including a non-volatile memory, which includes a user data area and a boot ROM area, and a ROM, which copies a first boot code from a main boot ROM area of the boot ROM area during boot-up, the boot ROM update method, comprising:
booting the first boot code;
writing a second boot code to a second area of the boot ROM area in response to a first ROM update command;
verifying validity of the second boot code written to the second area of the boot ROM area; and
if the second boot code written to the second area of the boot ROM area is valid, swapping a first area and the second area of the boot ROM area,
wherein before the swapping the first area and the second area of the boot ROM area, if a sudden power-off (SPO) occurs, detecting that power has been applied to initiate boot-up, performing boot-up using the first boot code, and writing the second boot code to the user data area in the non-volatile memory,
wherein the booting the first boot code comprises:
executing, by the ROM, a boot ROM loader;
loading, by the boot ROM loader, the first boot code from the main boot ROM area of the boot ROM area of the non-volatile memory;
executing, by the ROM, a boot loader by verifying integrity of the boot loader;
verifying, by the boot loader, integrity of a kernel; and
verifying, by the kernel, integrity of a file system.

17. The boot ROM method of claim 16, further comprising:
writing the first boot code to a backup boot ROM area, verifying validity of the first boot code written to the backup boot ROM area, and swapping the backup boot ROM area and the main boot ROM area if the first boot code written to the backup boot ROM area is valid.

18. The boot ROM method of claim 17, wherein the loading, by the boot ROM loader, the first boot code from the non-volatile memory comprises loading, by the boot ROM loader, the first boot code from the main boot ROM area of the non-volatile memory.

* * * * *